United States Patent [19]

Hopper

[11] 4,337,956
[45] Jul. 6, 1982

[54] DOUBLE LIP SEAL WITH PRESSURE COMPENSATION

[75] Inventor: James A. Hopper, Erie, Pa.

[73] Assignee: American Sterilizer Company, Erie, Pa.

[21] Appl. No.: 221,425

[22] Filed: Dec. 30, 1980

[51] Int. Cl.³ .......................... F16J 15/32; F16J 15/40
[52] U.S. Cl. ...................................... 277/29; 277/70; 277/152; 277/59
[58] Field of Search ............... 277/3, 27, 59, 70, 152, 277/153, 165, 207 R, 207 A, 208, 29

[56] References Cited

U.S. PATENT DOCUMENTS

| | | | |
|---|---|---|---|
| 2,177,441 | 10/1939 | Pesarese | 277/152 |
| 3,678,809 | 7/1972 | Doutt | 277/29 X |
| 3,871,666 | 3/1975 | Franz et al. | 277/59 |

FOREIGN PATENT DOCUMENTS

| | | | |
|---|---|---|---|
| 333029 | 2/1921 | Fed. Rep. of Germany | 277/59 |
| 880243 | 12/1942 | France | 277/59 |
| 1389832 | 4/1975 | United Kingdom | 277/59 |

*Primary Examiner*—Robert S. Ward, Jr.
*Attorney, Agent, or Firm*—Robert D. Yeager

[57] ABSTRACT

A sealing device for application between two confronting, generally parallel surfaces. One of the surfaces has a longitudinally extending groove for receiving the sealing device. The sealing device includes a base member having bottom surface contours to define a pair of spaced, longitudinally extending fluid passages between the base member and the groove. A pair of lip members are connected to the base member and extend therefrom for spaced-apart engagement with the other one of the confronting surfaces, thereby to form a third fluid passage between the lip members and the other said surface. Fluid communication means are provided between the fluid passages aforesaid.

10 Claims, 4 Drawing Figures

DOUBLE LIP SEAL WITH PRESSURE COMPENSATION

BACKGROUND OF THE INVENTION

1. Field of the Invention

This invention relates to a fluid tight seal which is particularly adapted for use when the direction of applied pressure across the seal alternates.

2. Description of the Prior Art

Under certain conditions it is desirable to perfect a seal between two surfaces that have fluid under pressure present therebetween with the pressure applied first in one direction and then in the opposite direction. An example of such conditions is the seal required for the door of a sterilizing chamber that operates under positive pressure during part of the sterilizing cycle and under vacuum during another part of the cycle.

Typically, the sealing devices used to seal the doors of sterilizing chambers are compression-type devices that depend for their efficacy on being crushed between the sterilizer door and the doorjamb. Such devices, though effective, are subject to wear upon each opening and closing of the door and eventually require repair or replacement. It would be desirable, therefore, to provide a sealing device that would be effective when the applied pressure across the seal alternates, yet would not depend on the application of mechanical compression forces between the surfaces to be sealed for its sealing properties.

SUMMARY OF THE INVENTION

The present invention employs a sealing device mounted in one surface to be sealed and having a pair of lips that engage the other surface to be sealed. The seal between the surfaces is effected by the application of fluid pressure against one or the other of the lips. By means of unique venting means embodied in the seal of the present invention, fluid pressures generated behind the base of the sealing device during operation are controlled to ensure retention of the base with minimal physical retention means. Because the seal of the present invention is achieved by the application of fluid pressure to the seal itself, the wear associated with mechanical compression seals is minimized. Further, the complex and expensive devices required to achieve mechanicals compression seals are eliminated.

The present invention provides a sealing device for application between two confronting, generally parallel surfaces, one of which surfaces having a longitudinally extending groove for receiving the sealing device, comprising: a base member formed of resilient material and, in its undeformed state, being dimensioned to snugly contact the groove only at portions of its opposed sides and at a portion of its bottom surface, thereby to form first and second spaced, longitudinally extending fluid passages between the base member and the groove; a pair of independently flexible, longitudinally extending, lip members connected to the base member and extending therefrom for longitudinally uninterrupted, spaced-apart engagement with the other one of the generally parallel surfaces, thereby to form a third fluid passage between the lip members and the other surface; means for providing transverse fluid communication between the first and second fluid passages; and means for providing fluid communication between the third fluid passage and the transverse fluid communication means.

In a preferred form, the base member of the present invention is formed with sides contoured to match substantially the sides of the groove and with a bottom portion defining a truncated dihedron offset from the central axis of the base member. In the same preferred form, the lip members are joined opposite their free ends and connected to the base member at a point offset from the central axis thereof in the same direction as the truncated dihedron.

With the base member of the sealing device of the present invention mounted in the groove formed in one surface to be sealed, the extending lip members form a Y-shaped structure with the adjacent inner surfaces of the upper legs of the "Y" being in contact with the other surface to be sealed. When pressure is applied to one side of the sealing device, the lip member on that side is forced into sealing contact with its associated surface. At the same time, the portion of the base member on the pressure side of the seal is forced further into the groove, causing fluid under pressure in the first and second fluid passages to be vented to atmosphere through the fluid communication means between those passages and the third fluid passage, into the third fluid passage, and between the lip member opposite the pressure side and its associated surface. When pressure is applied to the opposite side of the seal, the corresponding but opposite actions of the sealing device occur.

Other details and advantages of the present invention will become apparent as the following detailed description, taken with the accompanying drawings, proceeds.

DETAILED DESCRIPTION OF THE PREFERRED EMBODIMENTS

Figure 1:
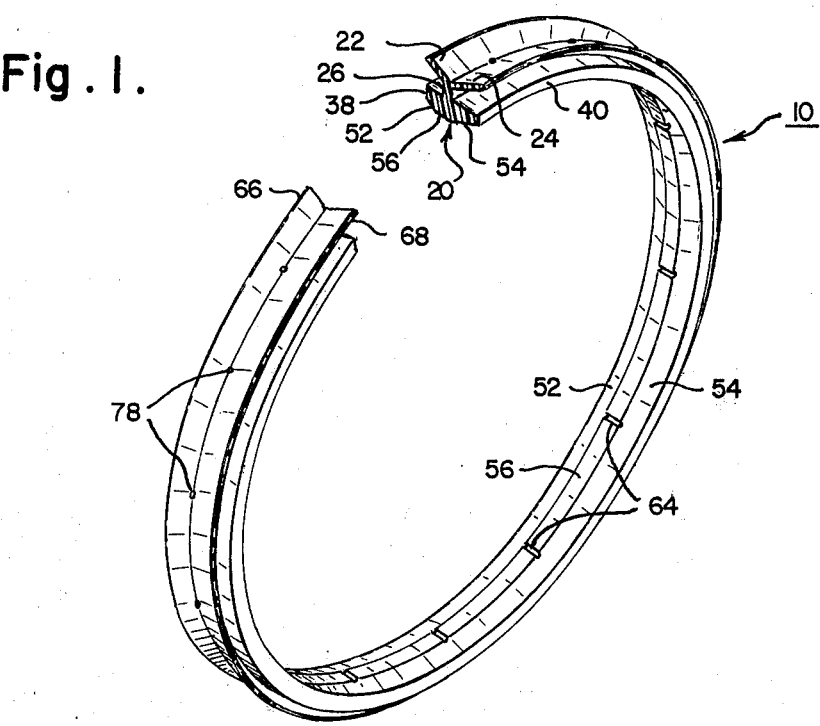
FIG. 1 is a perspective view of a portion of an annular sealing device embodying features of the present invention.
Figure 2:
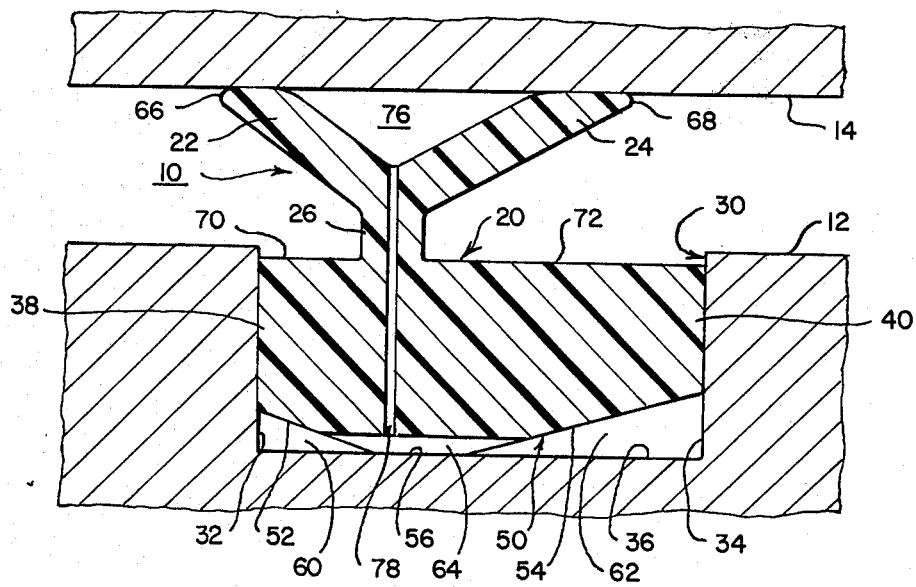
FIG. 2 is a sectional view showing the sealing device of FIG. 1 mounted to effect a seal between two generally parallel surfaces.

Referring to the drawings, particularly to FIG. 1, there is shown a sealing device, generally designated by the numeral 10, constructed in accordance with the present invention. In the embodiment shown in FIG. 1, sealing device 10 is formed in a ring, intended for perfecting a seal in an annular space between two surfaces such as confronting surfaces 12 and 14 shown in section in FIG. 2. Sealing device 10 may be formed from any suitable elastomeric resilient material; e.g. silicone rubber.

Sealing device 10 includes a base member, generally designated by the reference numeral 20, and a pair of lip members 22 and 24 connected to base member 20 by an upstanding neck portion 26. Together, lip members 22 and 24, and neck 26 form a Y-shaped structure extending from base member 20 and preferably formed integral therewith.

Sealing device 10 is intended to perfect a seal between surfaces 12 and 14. For this purpose, surface 12 has machined therein a groove, generally designated by the reference numeral 30 and, in the embodiment shown in the drawings, being of rectangular cross section. Groove 30 includes vertical sidewalls 32 and 34, and a flat bottom 36. Base member 20 of sealing device 10 is dimensioned such that, in its undeformed (or free form) state, sides 38 and 40 of base member 20, respectively, are contoured to match the contours of sidewalls 32 and 34 of groove 30 and to fit snugly thereagainst.

The bottom of base member 20, generally designated by the reference numeral 50, is formed of three surfaces: surfaces 52 and 54 inwardly extending from sides 38 and 40, respectively, at obtuse angles therefrom, and meeting flat surface 56. These surfaces together produce a downwardly extending, truncated dihedron as the bottom portion of base member 20. Preferably, and as shown in the drawings, the midpoint of flat surface 56 is transversely offset from the central axis of groove 30.

The relationship of inclined surfaces 52, 54 and flat surface 56 of bottom 50 with flat bottom 36 and vertical sides 38, 40 of groove 30 produce two spaced, longitudinally extending passages (or voids) 60 and 62, respectively, between base member 20 and groove 30. Passages 60 and 62 are interconnected for fluid communication at spaced intervals longitudinally along sealing device 10 by means of groove 64 (see FIG. 1) cut transversely in flat surface 56.

Referring now to the top portion of sealing device 10, lip members 22 and 24 are formed to be independently flexible and have rounded free end portions 66 and 68, respectively. Lip members 22 and 24 are joined opposite their free ends to neck 26 which, in turn, is joined to the top of base member 20. Preferably, and as shown in the drawings, neck 26 is transversely offset from the central axis of groove 30 in the same direction as flat surface 56 is offset therefrom. The top surface of base member 20 thereby is divided into a narrow top surface portion 70 to the left of neck 26 and a wide top surface portion 72 to the right of neck 26.

When lip members 22 and 24 are in engagement with surface 14, a longitudinally extending fluid passageway 76 is formed therebetween. Passageway 76 is connected for fluid communication with passageways 60 and 62 by means of vertical bores 78 in sealing device 10, extending between passageway 76 and grooves 64 at their same spaced intervals (see FIG. 1). Bores 78 in conjunction with grooves 64 thus provide means for venting fluid under pressure in either of fluid passageways 60 or 62 to fluid passageway 76; if the fluid pressure in the passageway thus exceeds the fluid pressure acting against the outer surface of either of lip members 22, 24, that pressure will force a momentary separation between such lip member and surface 14 to cause pressure equalization on both sides of the lip member involved.

It will be apparent to those skilled in the art that sealing device 10 and groove 30 may be variously constructed to depart from the embodiment just described in order to achieve the operative features of the present invention next to be described.

With sealing device 10 in place in groove 30, surfaces 12 and 14 are brought into confronting relationship as shown in the drawings; in this position, the adjacent inside surfaces of the ends 66, 68 of lip members 22, 24 are in contact with surface 14. In practice, this condition may be reached, for example, by closing the door of a sterilizing chamber wherein sealing device 12 is being used to seal the annular space surrounding the door. It will be noted that the operation of sealing device 10 does not depend upon being crushed between surfaces 12 and 14; thus, the only physical wear experienced by sealing device 10 is the gentle pressure needed to bring surface 14 into contact with lip members 22, 24 as just described.

Figure 3:
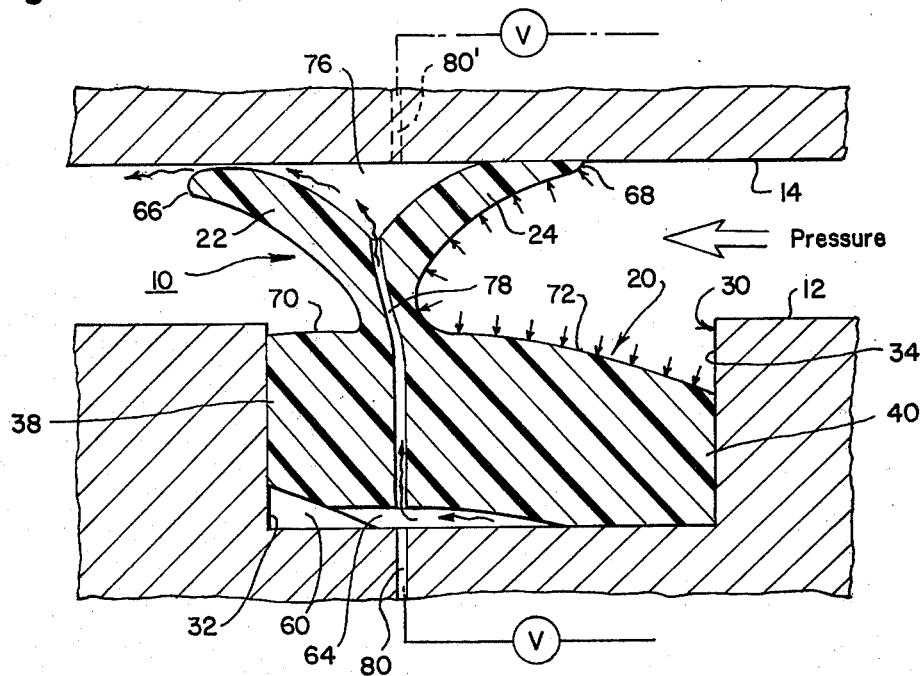
FIG. 3 is a view similar to FIG. 2 showing the operating characteristics of the sealing device upon application of pressure thereto from the right side.

Upon the application of fluid pressure across groove 30 from right to left as shown by the arrow in FIG. 3, lip 24 is pushed inwardly and upwardly to effect a seal against surface 14. At the same time, the positive fluid pressure exerts force on surface portion 72 of base member 20, pushing the right side of base member 20 further into groove 30. This downward flexing action causes the partial or complete elimination of fluid passage 62 and a corresponding reduction in the volume available in fluid passages 60, 62, and groove 64. Any fluid trapped in these confines is forced upwardly (as indicate by the arrows in FIG. 3) through bore 78 and into fluid passage 76. Because of the reduction in volume as aforesaid, the pressure of the fluid in fluid passage 76 exceeds atmospheric pressure acting upon the left side of lip member 22; consequently, free end 66 of lip member 22 is forced to separate momentarily from its engagement with surface 14 to permit fluid under pressure in fluid passage 76 to escape to atmosphere (as shown by the arrows in FIG. 3). When the pressure on both sides of lip member 22 equalizes at atmospheric pressure, free end 66 of lip member 22 returns to contact surface 14.

It may be seen that the downward flexing of the right side of base member 20 enhances the sealing action between side 40 of base member 20 and sidewall 34 of groove 30. This downward flexing action also is transmitted to the left side of base member 20 to enhance the sealing action between side 38 of base member 20 and sidewall 32 of groove 30. Because the fluid pressure within fluid passage 60 has been brought to atmospheric pressure in the manner just described, there is no pressure differential between fluid passage 60 and surface portion 70 of base member 20. Accordingly, there is no tendency to force the left side of base member 20 out of groove and thereby "pop" the seal. This pressure equalization feature of the present invention represents a major improvement of prior art sealing devices employed under similar conditions.

It may also be seen that because of the venting action achieved by bore 78 as described above, there is no significant fluid pressure resistance to the downward flexing of the right side of base member 20 under the influence of the positive pressure exerted above. As indicated above, the greater the downward flexing of the right side of base member 20, the greater the sealing action of base member 20 within groove 30.

The action of sealing device 10 when there is a reversal of the pressure applied across groove 30 now will be described. This reversal of applied pressure may occur, for example, when the chamber being sealed by sealing device 10, say a sterilizing chamber, is operated under vacuum conditions.

Figure 4:
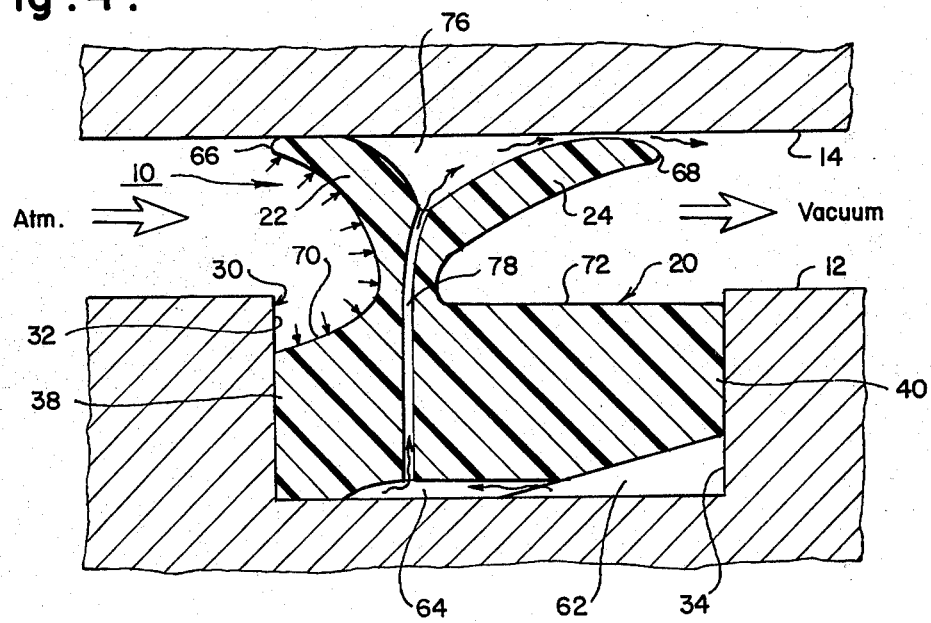
FIG. 4 is a view similar to FIG. 2 showing the operating characteristics of the sealing device upon application of pressure thereto from the left side.

As indicated by the arrow in FIG. 4, such conditions cause the applied pressure across groove 30 to be acting from left to right. The pressure causes lip 22 to be pushed inwardly and upwardly to effect a seal against surface 14. At the same time, the fluid pressure exerts force on surface portion 70 of base member 20, pushing the left side of base member 20 further into groove 30. This downward flexing action causes the partial or complete elimination of fluid passage 60 and a corresponding reduction in the volume available in fluid passages 60, 62 and groove 64. Any fluid trapped in these confines is forced upwardly (as indicated by the arrows in FIG. 4) through bore 78 and into fluid passage 76. Because of the reduction in volume as aforesaid, the pressure of the fluid in fluid passage 76 exceeds the subatmospheric fluid pressure acting upon the right side of lip member 24; consequently, free end 68 of lip member 24 is forced to separate momentarily from its engagement with surface 14 to permit fluid under pressure in fluid passage 76 to escape to the area of reduced pressure (as shown by the arrows in FIG. 4). When the pressure on both sides of lip member 24 equalizes at some subatmospheric value, free end 68 of lip member 24 returns to contact with surface 14.

As with the operation of sealing device 10 under positive pressure described above, the downward flexing of the left side of base member 20 enhances the sealing action of sides 38, 40 of base member 20 against sidewalls 32, 34 of groove 30. Again, because of the venting action achieved through bore 78 and the resultant equalization of pressure acting between fluid passage 62 and surface portion 72 of base member 20, there is no tendency to "pop" the seal by the right side of base member 20 being forced out of groove 30. Also, this venting action substantially eliminates any resistance to the downward flexing of the left side of base member 20 by exhausting fluid under pressure from fluid passage 60.

The present invention, therefore, operates to perfect excellent sealing action between surfaces 12 and 14 under application of either superatmospheric or subatmospheric pressure to the chamber being sealed. Further, when it is desired to separate surfaces 12 and 14, the present invention minimizes the "suction cup" effect that is usually experienced with double lip seals. That is, a double lip seal with no means for venting fluid passage 76 often acts as a suction cup against surface 14; when separation of the sealed surfaces is attempted in such case, the suction cup effect acting on one surface causes the sealing device to be pulled from its mounting on the opposite surface.

If, by reason of the particular design of the sealing device of the present invention or the materials of construction used therein, there exists any tendency for the suction cup effect to occur upon attempted separation of surfaces 12 and 14, the effect may be eliminated by first venting fluid passage 76 to atmosphere through passage 80 located in groove 30 (shown only in FIG. 3). Alternatively, fluid passage 76 may be vented to atmosphere through passage 80' located in surface 14.

What is claimed is:

1. A sealing device for application between two confronting, generally parallel, longitudinally extending surfaces, one of which surfaces having a longitudinally extending groove for receiving said sealing device, comprising:
    a base member formed of resilient material and, in its undeformed state, being dimensioned to snugly contact said groove only at portions of its opposed sides and at a portion of its bottom surface, thereby to form first and second spaced, longitudinally extending fluid passages between said base member and said groove;
    a pair of independently flexible, longitudinally extending lip members connected to said base member and extending therefrom for longitudinally uninterrupted, spaced-apart engagement with the other one of said generally parallel surfaces, thereby to form a third fluid passage between said lip members and said other surface;
    means for providing transverse fluid communication between said first and second fluid passages; and
    means for providing fluid communication between said third fluid passage and said transverse fluid communication means.

2. A sealing device as recited in claim 1 wherein:
    said base member is formed with sides contoured to match substantially the sides of said groove and with a bottom portion defining a truncated dihedron offset from the central axis of said base member.

3. A sealing device as recited in claim 2 wherein:
    said lip members are joined opposite their free ends and connected to said base member at a point offset from the central axis thereof in the same direction as said truncated dihedron.

4. A sealing device as recited in claim 3 wherein:
    said lip members are formed integrally with said base member and define in section a Y-shaped structure extending therefrom.

5. A sealing device as recited in claim 3 wherein:
    said transverse fluid communication means comprises at least one transverse groove formed in the bottom surface of said truncated dihedron.

6. A sealing device as recited in claim 5 wherein:
    said fluid communication means between said third fluid passage and said transverse fluid communication means comprises at least one bore generally aligned with the vertical leg of said Y-shaped structure and intersecting said transverse groove.

7. A fluid seal comprising:
    a pair of confronting, generally parallel, longitudinally extending surfaces surrounding an opening in a vessel adapted to operate at both superatmospheric and subatmospheric pressures, one of said surfaces having a longitudinally extending groove formed therein and adapted to receive a sealing device therein;
    fluid under pressure disposed between said surfaces with the pressure applied first in one direction and then in the opposite direction across said groove; and
    a sealing device disposed within said groove and effecting a seal between said surfaces;
    said sealing device having:
        (i) a base member formed of resilient material and, in its underformed state, being dimensioned to snugly contact said groove only at portions of its opposed sides and at a portion of its bottom surface, thereby to form first and second spaced, longitudinally extending fluid passages between said base member and said groove,
        (ii) inboard and outboard independently flexible, longitudinally extending lip members connected to said base and extending therefrom for longitudinally uninterrupted, spaced-apart engagement with the surface opposite said grooved surface, thereby to form a third fluid passage between said lip members and said opposite surface,
        (iii) means for providing transverse fluid communication between said first and second fluid passages, and
        (iv) means for providing fluid communication between said third fluid passage and said transverse fluid communication means;
    whereupon during conditions when said vessel is operating at superatmospheric pressure and said fluid under pressure disposed between said surfaces is applied across said groove in a direction away from said vessel, the portion of said base member under superatmospheric pressure is forced further into said groove and fluid under pressure in said first and second fluid passages is vented to atmosphere through said third fluid passage and thence between said outboard lip member and said surface opposite said grooved surface;

whereupon during conditions when said vessel is operating under subatmospheric pressure and said fluid under pressure disposed between said surfaces is applied across said groove in a direction toward said vessel, the portion of said base member against which said pressure is applied is forced further into said groove and fluid under pressure in said first and second fluid passages is vented to said vessel through said third fluid passage and thence between said inboard lip member and said surface opposite said grooved surface.

8. A fluid seal as recited in claim 7 which further comprises:
means for venting said third fluid passage prior to separation of said confronting surfaces.

9. A fluid seal as recited in claim 8 wherein:
said venting means comprises a fluid passage communicating between said transverse fluid passage and the atmosphere.

10. In a fluid seal between a pair of confronting, generally parallel surfaces, one of said surfaces having mounted thereon a sealing device having a pair of lip members adapted for contact with the other of said confronting surfaces and defining therebetween a fluid passage subject to subatmospheric pressures when said sealing device is operative, the improvement comprising:
means disposed in one or the other of said confronting surfaces for venting said fluid passage to atmosphere prior to effecting separation of said confronting surfaces.

* * * * *

UNITED STATES PATENT AND TRADEMARK OFFICE
CERTIFICATE OF CORRECTION

PATENT NO. : 4,337,956

DATED : July 6, 1982

INVENTOR(S) : James A. Hopper

It is certified that error appears in the above—identified patent and that said Letters Patent is hereby corrected as shown below:

Col. 6, line 47, delete "underformed", and substitute therefor --undeformed--.

Signed and Sealed this

Fourteenth Day of September 1982

[SEAL]

Attest:

GERALD J. MOSSINGHOFF

Attesting Officer

Commissioner of Patents and Trademarks